(12) United States Patent
Zhang et al.

(10) Patent No.: US 7,335,258 B2
(45) Date of Patent: Feb. 26, 2008

(54) FUNCTIONALIZATION AND SEPARATION OF NANOTUBES AND STRUCTURES FORMED THEREBY

(75) Inventors: Yuegang Zhang, Cupertino, CA (US); Robert J. Chen, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 478 days.

(21) Appl. No.: 11/097,683

(22) Filed: Mar. 31, 2005

(65) Prior Publication Data

US 2006/0223991 A1    Oct. 5, 2006

(51) Int. Cl.
 *C30B 29/02* (2006.01)
(52) U.S. Cl. .............. 117/68; 117/2; 423/445
(58) Field of Classification Search ............. 117/2, 117/68; 423/445
See application file for complete search history.

(56) References Cited

U.S. PATENT DOCUMENTS

| | | | |
|---|---|---|---|
| 2002/0081732 A1* | 6/2002 | Bowlin et al. | 435/446 |
| 2005/0261760 A1* | 11/2005 | Weber | 623/1.38 |
| 2006/0100696 A1* | 5/2006 | Atanasoska et al. | 623/1.44 |
| 2006/0184112 A1* | 8/2006 | Horn et al. | 604/103.08 |

OTHER PUBLICATIONS

Pending U.S. Appl. No. 11/095,414, filed Mar. 30, 2005; inventor: Zhang.

* cited by examiner

*Primary Examiner*—Robert Kunemund
(74) *Attorney, Agent, or Firm*—Kathy Ortiz

(57) ABSTRACT

Methods of forming a microelectronic structure are described. Embodiments of those methods include attaching at least one functional group to a chondroitin sulfate molecule, and then attaching the at least one functional group to a carbon nanotube, wherein the carbon nanotube is made soluble in a solution.

21 Claims, 6 Drawing Sheets

US 7,335,258 B2

FUNCTIONALIZATION AND SEPARATION OF NANOTUBES AND STRUCTURES FORMED THEREBY

BACKGROUND OF THE INVENTION

Carbon nanotubes may become building blocks for mechanical, electronic, and biological devices, for example. Such applications may be enabled by separating different classes of carbon nanotubes from each other.

BRIEF DESCRIPTION OF THE DRAWINGS

While the specification concludes with claims particularly pointing out and distinctly claiming certain embodiments of the present invention, the advantages of this invention can be more readily ascertained from the following description of the invention when read in conjunction with the accompanying drawings in which:

DETAILED DESCRIPTION OF THE PRESENT INVENTION

Figure 1A:
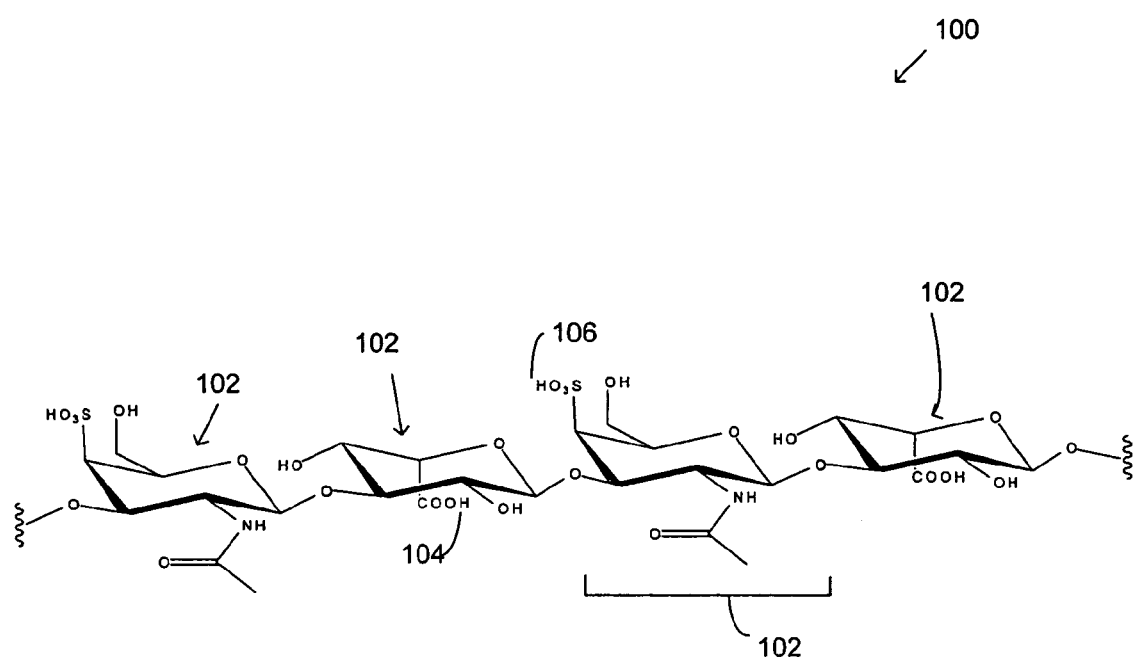
FIGS. 1a-1c represent methods of forming structures according to an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense; and the scope of the present invention is defined only by the appended claims, appropriately interpreted, along with the full range of equivalents to which the claims are entitled. In the drawings, like numerals refer to the same or similar functionality throughout the several views.

Methods and associated structures of solubilizing and separating carbon nanotubes are described. Those methods may comprise attaching at least one functional group to a chondroitin sulfate molecule and then attaching the at least one functional group to a carbon nanotube, wherein the carbon nanotube is made soluble in a solution.

Figure 1B:
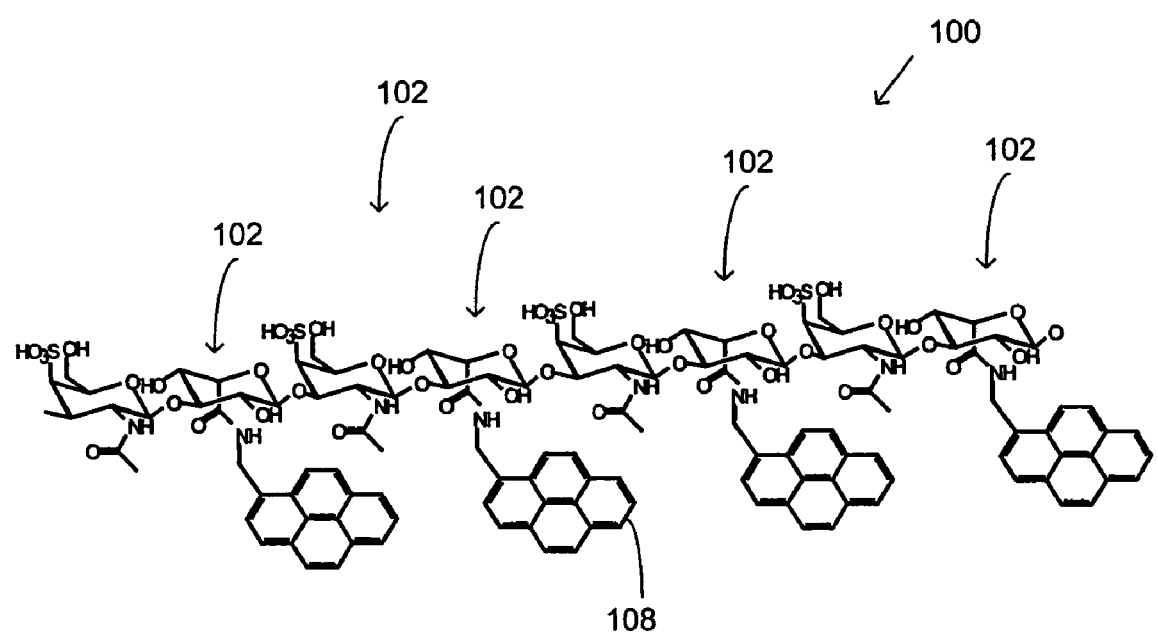
Figure 1C:
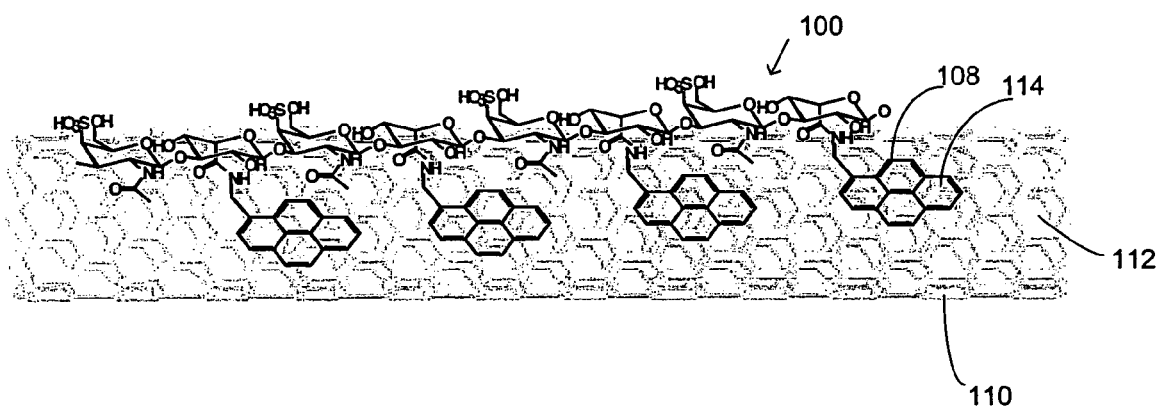

FIGS. 1a-1c illustrate an embodiment of a method of the present invention. FIG. 1a illustrates a chondtroitin sulfate molecule 100, as is known in the art. The chondroitin sulfate molecule 100 may comprise at least one subunit 102. In one embodiment, alternating subunits 102 in the chain of the chondroitin sulfate molecule 100 may comprise at least one carboxylic group 104 and/or at least one sulfate group 106. The chondroitin sulfate molecule 100 may comprise a negatively charged structure that may exhibit excellent solubility in a liquid solution, such as an aqueous and/or organic solvent solution, for example.

In one embodiment, at least one functional group 108 may be attached and/or linked to the chondroitin sulfate molecule 100 (FIG. 1b). In one embodiment, the chondtroitin sulfate molecule 100 may be reacted attached and/or linked by a covalent bonding mechanism, such as during a chemical reaction, for example. In one embodiment, the at least one functional group 108 may comprise any molecule that comprises an extended pi system, such as various bases as are known in the art, but could also comprise any molecule that can be attached and/or linked to the chondroitin sulfate molecule 100.

In one embodiment, the at least one functional group 108 may comprise at least one of adenine, guanine, cytosine, thymine, pyrene and anthracene. In one embodiment, the at least one functional group 108 may be attached and/or conjugated to a carboxylic group 104 and/or a sulfate group 106 of the chondroitin sulfate molecule 100. In one embodiment, the at least one functional group 108 may be attached to alternating subunits 102 of the chondroitin sulfate molecule 100.

In one embodiment, the at least one functional group 108 that may be attached to the chondroitin sulfate molecule 100 may then be attached to a carbon nanotube 110, as are well known in the art (FIG. 1c). In one embodiment, the pi electrons 114 of the at least one functional group 108 may form a bond and/or be bound to the pi electrons 112 on the surface of the carbon nanotube 110, through pi-pi stacking interactions. In one embodiment, the at least one functional group 108 may be attached to the chodroitin sulfate molecule 100 through Van der Waal forces, as are well known in the art. In one embodiment, attaching the chondroitin sulfate molecule 100 comprising the functional group 108 to the carbon nanotube 110 may impart a negative charge to the carbon nanotube 110.

By attaching the chondroitin sulfate molecule 100 comprising the functional group 108 to the carbon nanotube 110, the carbon nanotube 110 may be made soluble (i.e., they may be dissolved) in a solution, such as an aqueous and/or an organic solution, for example. In one embodiment, carbon nanotubes in a liquid solution that may comprise an attached chondroitin sulfate molecule 100 may be repelled from other such carbon nanotubes, due to the highly negative charge of the chondroitin sulfate molecule 100. Thus, agglomeration and/or precipitation of such carbon nanotubes in a solution may be reduced or eliminated. In addition, by attaching chondroitin sulfate molecules to carbon nanotubes, carbon nanotubes may be economically solubilized, since chondroitin sulfate is relatively economical to manufacture and process.

Figure 2A:
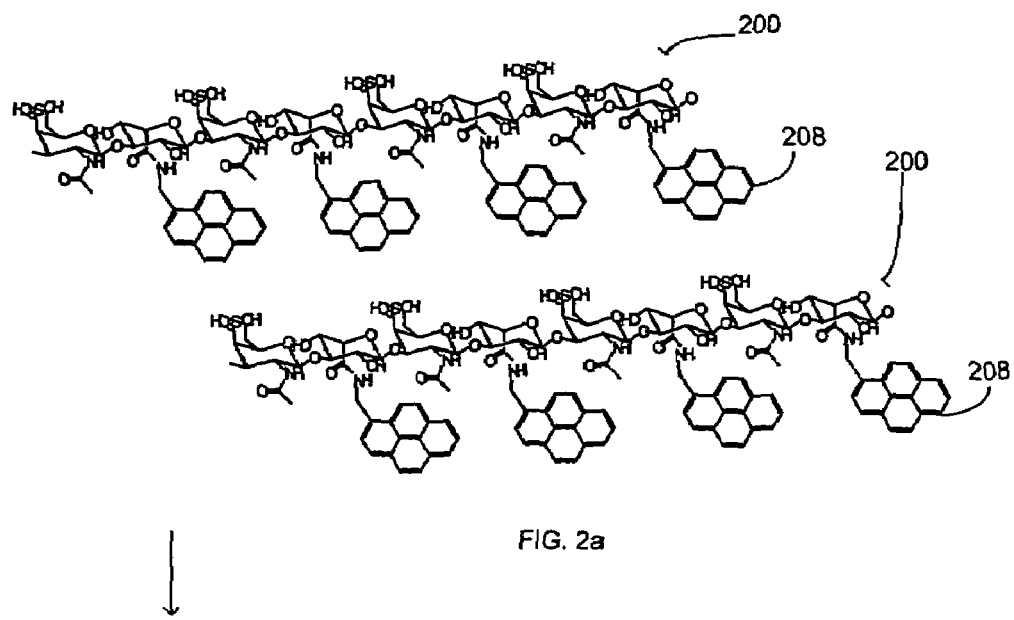
FIGS. 2a-2c represent methods of forming structures according to an embodiment of the present invention.

FIG. 2a depicts another embodiment of the present invention. In one embodiment, at least one chondroitin sulfate molecule 200 may comprise at least one functional group 208. In one embodiment, the at least one chondroitin sulfate molecule 200 may reside in a solution, such as an aqueous and/or organic solution, for example. The at least one chondroitin sulfate molecule 200 comprising the at least one functional group 208 may comprise a highly negative charge and may be soluble in a solution. In one embodiment, the at least one functional group 208 may comprise at least one of adenine, guanine, cytosine, thymine, pyrene and anthracene, but could also comprise any molecule that can be attached and/or linked to the chondroitin sulfate molecule 200.

Figure 2B:
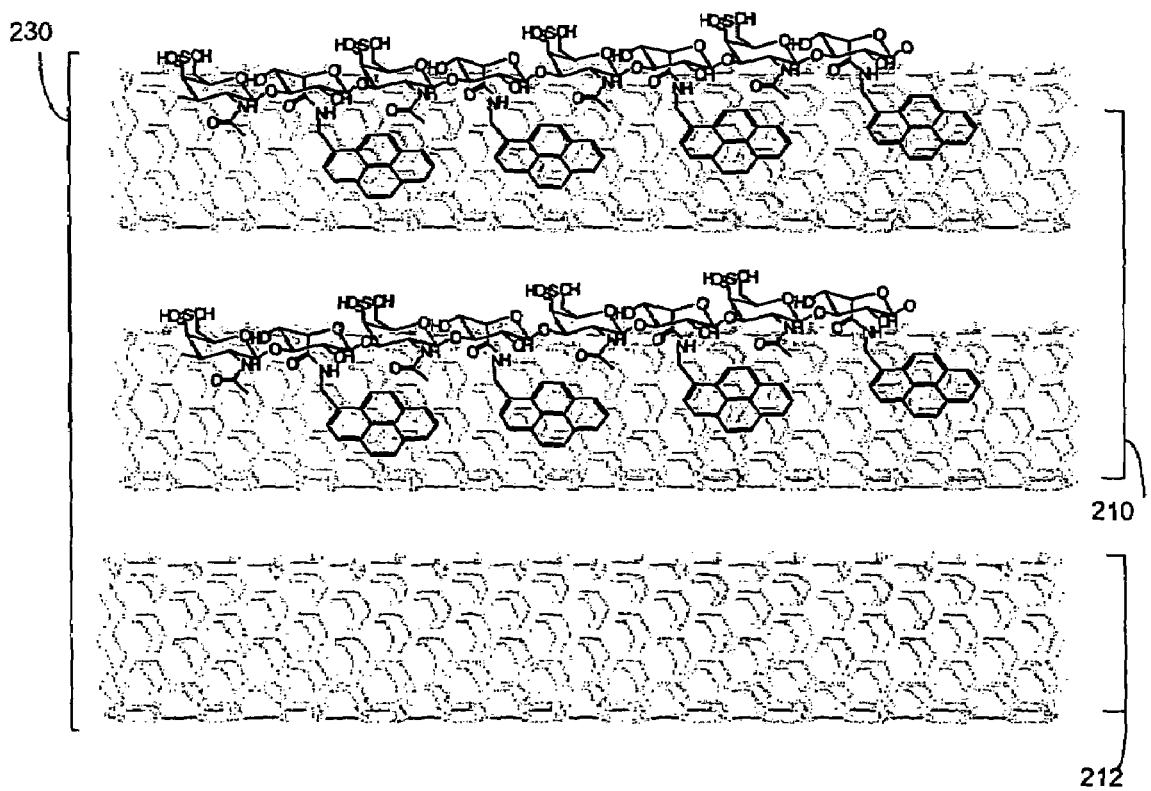

In one embodiment, the at least one functional group 208 that may be attached to the chondroitin sulfate molecule 200 may be chosen such that the at least one functional group 208 may bind and/or react with a targeted class of carbon nanotube 210, and may not bind and/or react with a non-targeted class of carbon nanotube 212 (FIG. 2b). For example, in some applications it may be desired to separate out of a solution a specific class of carbon nanotube, such as by illustration and not limitation separating a class of carbon nanotubes comprising a range of chiral properties (as are well known in the art), for example.

In another embodiment, it may be desired to separate carbon nanotubes according to a carbon nanotube class comprising a particular range of diameter size, for example. In general, the at least one functional group 208 may be chosen such that any sorting and/or separating mechanism, such as sorting and/or separating carbon nanotubes by electrical, physical and/or chemical properties, for example, will be facilitated for a particular application. In one embodiment, processes that may be utilized to separating and/or sort classes of nanotubes from each other according to their properties may include filtering, chromatography, and electrophoresis, for example.

Figure 2C:
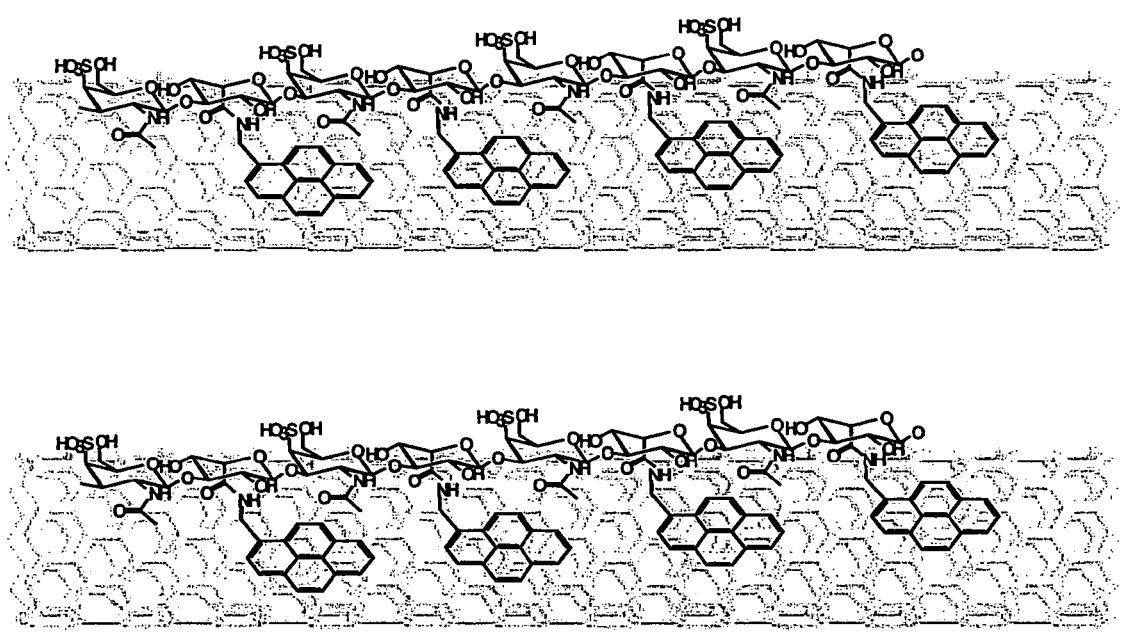

In one embodiment, the at least one functional group 208 of the chondroitin sulfate molecule 200 may be selectively attached to at least one of a plurality of carbon nanotubes 230. The selective attachment may be dependent upon a particular targeted class of carbon nanotubes that may comprise a specific property that may be desired to separate out from the remainder of the plurality of carbon nanotubes. In one embodiment, the at least one carbon nanotube 210 may belong to a targeted class of carbon nanotubes that may be separated from the non-targeted class of carbon nanotube 212 (FIG. 2c).

In this manner, a selected class of carbon nanotubes may be separated from other non-selected classes of carbon nanotubes by targeting the selected class of carbon nanotubes for attachment with a selected functionalized chondroitin sulfate molecule so that they may be substantially solubilized, while untargeted classes of carbon nanotubes may not be appreciably solubilized. Therefore, different classes of carbon nanotubes may be separated from each other by utilizing solubility differences, wherein the solubility differences may be tailored by the choice of the functional group attached to the chondroitin sulfate molecule.

Figure 3:
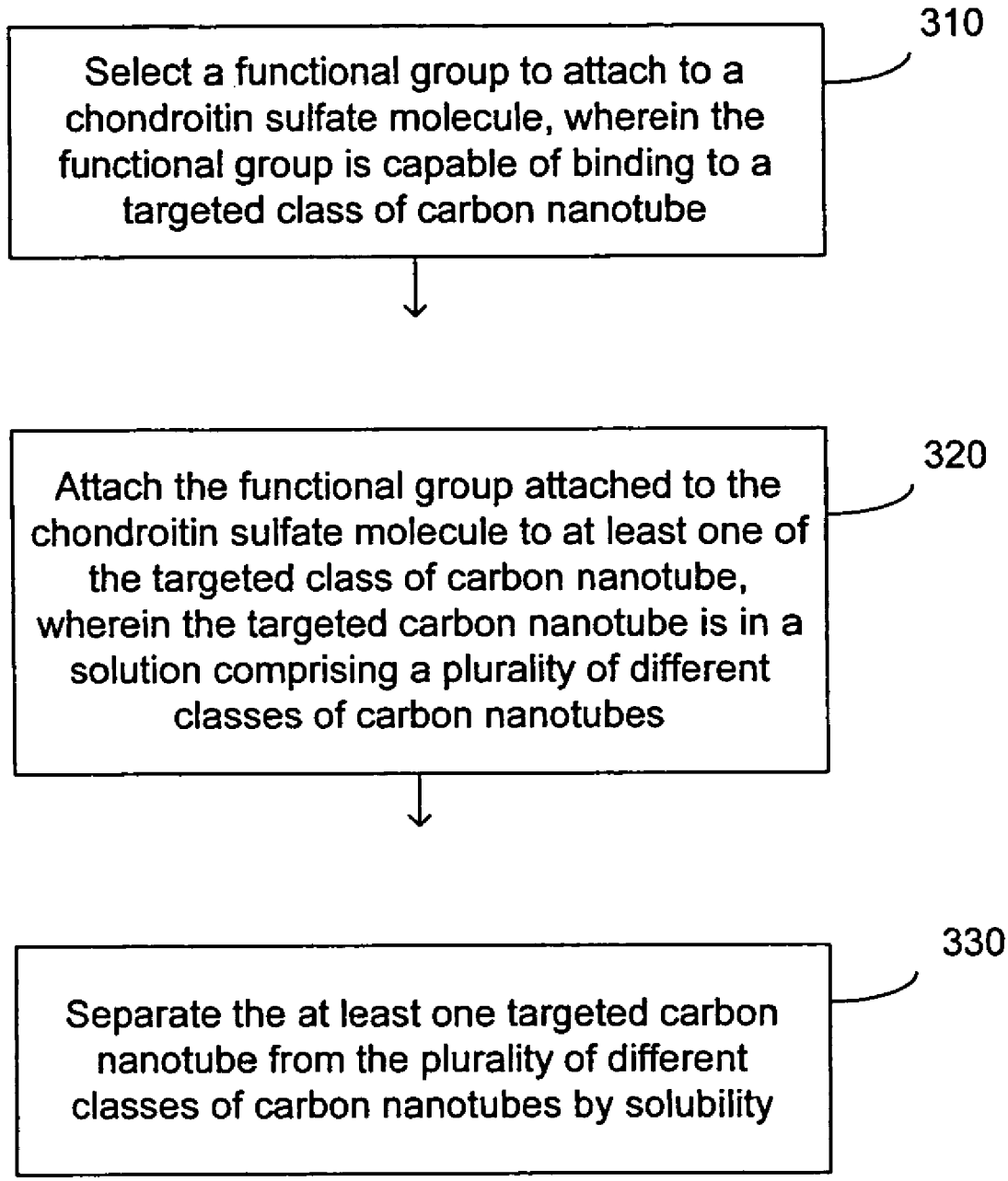
FIG. 3 represents a flow chart according to an embodiment of the present invention.

FIG. 3 depicts a flow chart of an embodiment of the present invention. At step 310, a functional group is selected to attach to a chondroitin sulfate molecule, wherein the functional group is capable of binding to a targeted class of carbon nanotube. At step 320, the functional group that is attached to the chondroitin sulfate molecule is attached to at least one of the targeted class of carbon nanotube, wherein the targeted carbon nanotube is in a solution comprising a plurality of different classes of carbon nanotubes. At step 330, the at least one targeted carbon nanotube is separated from the plurality of different classes of carbon nanotubes by utilizing solubility differences between the targeted and non-targeted carbon nanotube classes.

Although the foregoing description has specified certain steps and materials that may be used in the method of the present invention, those skilled in the art will appreciate that many modifications and substitutions may be made. Accordingly, it is intended that all such modifications, alterations, substitutions and additions be considered to fall within the spirit and scope of the invention as defined by the appended claims. In addition, it is appreciated that various molecular structures, such as chondroitin sulfate molecules, are well known in the art. Therefore, the Figures provided herein illustrate only portions of an exemplary structure that pertains to the practice of the present invention. Thus the present invention is not limited to the structures described herein.

What is claimed is:

1. A method comprising:
    attaching at least one functional group to a chondroitin sulfate molecule; and
    attaching the at least one functional group attached to the chondroitin sulfate molecule to a carbon nanotube, wherein the carbon nanotube is made soluble in a solution.

2. The method of claim 1 wherein attaching the at least one functional group to the carbon nanotube comprises binding the at least one functional group to the carbon nanotube by utilizing pi-pi stacking interactions.

3. The method of claim 1 wherein attaching the at least one functional group to the chondroitin sulfate molecule comprises attaching at least one of adenine, guanine, cytosine, thymine, pyrene and anthracene to the chondroitin sulfate molecule.

4. The method of claim 1 wherein attaching the at least one functional group to the chondroitin sulfate molecule comprises attaching the at least one functional group to at least one of a carboxylic group and a sulfate group of the chondroitin sulfate molecule.

5. The method of claim 1 further comprising wherein the at least one functional group is attached to alternating subunits of the chondroitin sulfate molecule.

6. The method of claim 1 further comprising wherein the carbon nanotube is made soluble in a solution.

7. A method comprising:
    selectively attaching a chondroitin sulfate molecule to at least one of a targeted class of carbon nanotube, wherein the at least one of the targeted class of carbon nanotube is in a solution comprising a plurality of different classes of carbon nanotubes; and
    separating the at least one of the targeted class of carbon nanotube from the plurality of different classes of carbon nanotubes.

8. The method of claim 7 wherein selectively attaching the chondroitin sulfate molecule to the at least one of the targeted class of carbon nanotubes comprises selectively attaching a functional group of the chondroitin sulfate molecule to the at least one of the targeted class of carbon nanotubes, wherein the functional group is capable of binding to a targeted class of carbon nanotube.

9. The method of claim 8 further comprising wherein the functional group does not substantially bind to a non-targeted targeted class of carbon nanotube 10. The method of claim 8 wherein selectively attaching a functional group comprises selectively attaching at least one of adenine, guanine, cytosine, thymine, pyrene and anthracene.

11. The method of claim 7 wherein the at least one of the targeted class of carbon nanotube that is selectively attached to the chondroitin sulfate molecule is soluble in a solution.

12. The method of claim 11 further comprising wherein the at least one of the targeted class of carbon nanotube is not substantially agglomerated or precipitated in the solution.

13. The method of claim 7 further comprising wherein the selective attachment is dependent upon a property of the at least one of the targeted class of carbon nanotube.

14. The method of claim 13 wherein the selective attachment is dependent upon at least one of a chirality and a diameter of the at least one of the targeted class of carbon nanotube.

15. A structure comprising:
 at least one chondroitin sulfate molecule attached to a carbon nanotube, wherein the chondroitin sulfate molecule comprises at least one functional group.

16. The structure of claim 15 wherein the at least one functional group is bound to the carbon nanotube by pi-pi stacking interactions.

17. The structure of claim 15 wherein the at least one functional group comprises at least one of adenine, guanine, cytosine, thymine, pyrene and anthracene.

18. The structure of claim 15 wherein the at least one functional group is attached to at least one of a carboxylic group and a sulfate group of the chondroitin sulfate molecule.

19. The structure of claim 15 wherein the at least one functional group is attached to alternating subunits of the chondroitin sulfate molecule.

20. The structure of claim 15 wherein the carbon nanotube is soluble in a solution.

21. The structure of claim 20 wherein the carbon nanotube is not substantially agglomerated or precipitated in the solution.

* * * * *